March 27, 1956 J. S. WHITE 2,739,782
VARIABLE AREA TURBINE NOZZLE
Filed Oct. 7, 1952 2 Sheets-Sheet 1
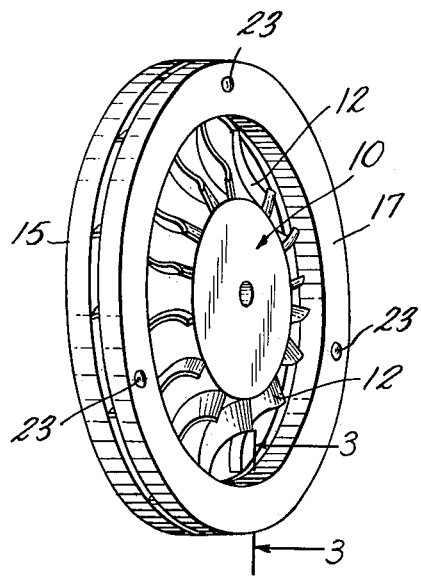
FIG. I.
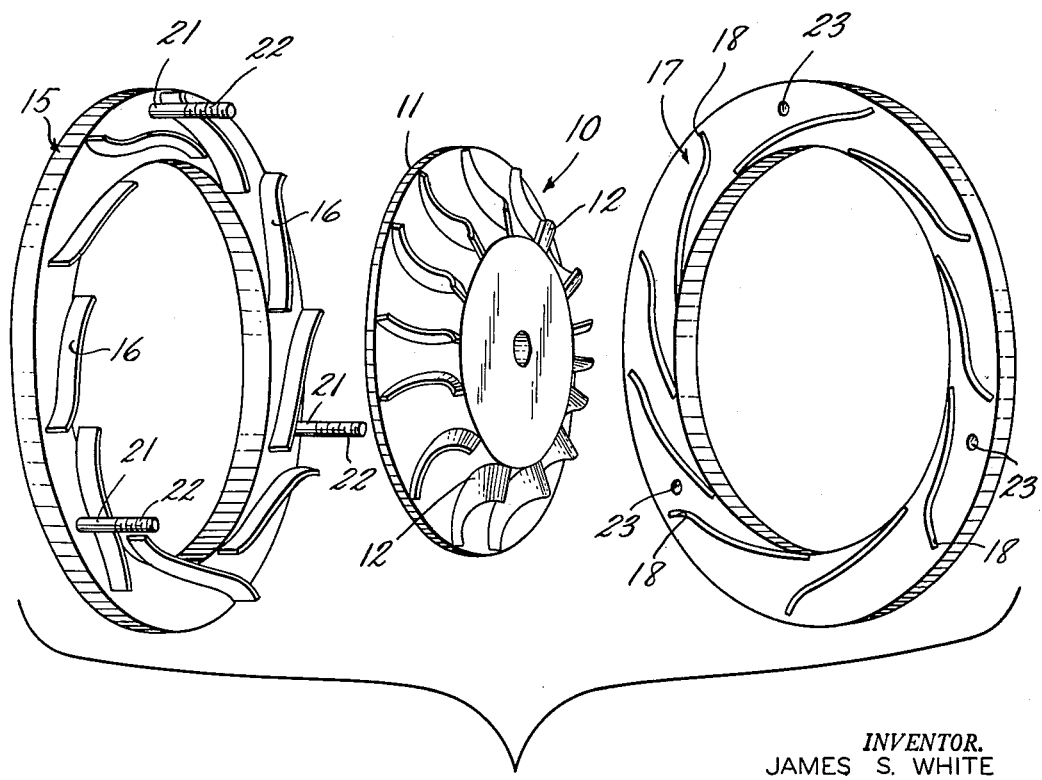
FIG. 2.
INVENTOR.
JAMES S. WHITE
BY
ATTORNEYS March 27, 1956 J. S. WHITE 2,739,782
VARIABLE AREA TURBINE NOZZLE
Filed Oct. 7, 1952 2 Sheets-Sheet 2

INVENTOR.
JAMES S. WHITE
BY
his ATTORNEYS.

United States Patent Office 2,739,782
Patented Mar. 27, 1956

2,739,782

VARIABLE AREA TURBINE NOZZLE

James S. White, East Williston, N. Y., assignor to Fairchild Engine and Airplane Corporation, Bay Shore, N. Y., a corporation of Maryland Application October 7, 1952, Serial No. 313,486

2 Claims. (Cl. 253—52)

This invention relates to centripetal and centrifugal turbines, and has particular reference to a variable area nozzle for fluid turbines of the radial flow type, although the invention is not limited to that use.

Inasmuch as the usual fixed area turbine nozzle is designed to deliver maximum efficiency at one value of flow, speed and load, operation under any other condition results in reduced efficiency. In some installations, particularly for aircraft use, continually changing conditions require greater flexibility of operation at reasonably constant efficiency so that the usual fixed area nozzle turbine is not adequate to give the required performance. In order to accommodate these varying operating conditions, tilting or pivoted nozzle vanes have been utilized to vary the effective nozzle area, but complicated linkages, cams, mechanisms and close machining tolerances are required to operate them with consequent increase in weight, frequent repairs and unreliability.

In accordance with the present invention, a variable area nozzle system for fluid turbines is provided which is simple in construction, positive and accurate in operation, requires little operating mechanism or any close tolerances, and maintains a constant angle of impingement of the propulsion fluid on the turbine blades for all values of fluid flow.

In a preferred embodiment of the invention as applied to a radial flow turbine, a relatively fixed nozzle ring is provided with fixed radial vanes of any desired contour which are slidably received in matching slots in the face of an axially movable ring, whereby the spacing between the nozzle rings may be adjusted at will to vary the height of the nozzle orifice without requiring any adjustment of the nozzle vanes. Relative axial movement between the nozzle rings may be simply obtained by screw thread or lead screw mechanism, a rack and pinion, a cam mechanism or the like, actuated by a suitable control.

It will be seen that the variable height nozzle mechanism of this invention enables the delivery of the requisite quantity of propulsion fluid to the turbine rotor in precise accordance with load requirements, so that low power demand is met by a narrow or low height nozzle adjustment, whereas high power demand is quickly met by increasing the nozzle area accordingly by increasing the spacing between the nozzle rings.

For a more complete understanding of the invention, reference may be had to the accompanying drawings, in which:

Figure 1 is a perspective view of the adjustable nozzle turbine removed from its casing and showing the two axially adjustable nozzle rings;

Fig. 2 is an exploded view of the turbine assembly shown in Fig. 1, and illustrates the several parts thereof;

Figure 4:
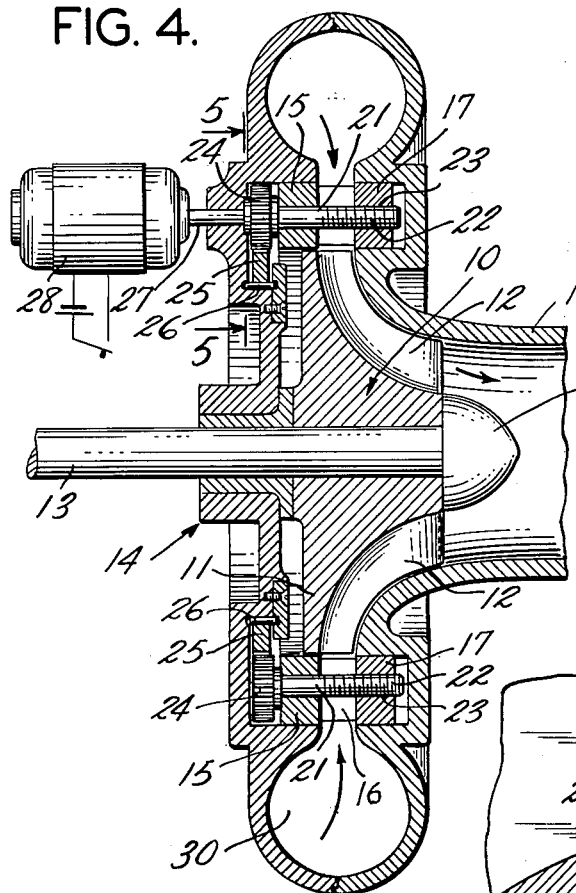
Fig. 4 is a transverse section through the turbine assembly of Fig. 1, enclosed in its casing and showing a rack and pinion arrangement for adjusting the height of the nozzle.

Referring to Figs. 1, 2 and 4 of the drawings, numeral 10 designates a turbine rotor of the radial flow type having the disc-like base 11 of generally concavo-conical shape with the blades 12 mounted radially on the concave face thereof. As shown in Fig. 4, the rotor 10 is secured to the shaft 13 and has the conically streamlined hub cap 13', the shaft 13 being journalled in the turbine stator casing 14 of generally conventional construction, except for the changes necessary to accommodate the present invention.

Rotor 10 is adapted to rotate within a fixed ring 15 suitably mounted within the stator casing 14 and having formed on or secured to one face thereof, a series of nozzle vanes 16, best shown in Fig. 2. The vanes 16 are generally radial and direct the propulsion fluid, such as air, radially inward toward the turbine shaft 13, the contour of the nozzle vanes 16 being predetermined to afford the desired directional flow.

Figure 3:
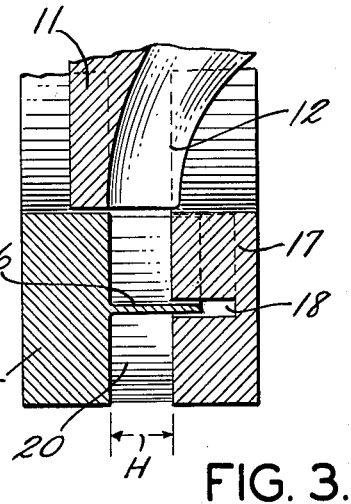
Fig. 3 is an enlarged axial section through the assembly, as seen along the line 3—3 of Fig. 1.

As is shown particularly in Figs. 3 and 4, the peripheral surface of the conical portion of the rotor disc 11 registers with the radially inner surface of the ring 15, and the radially outer edges or tips of the blades 12 of the rotor 10 just clear the radially inner edges of the nozzle vanes 16.

Spaced axially from relatively fixed ring 15 and having approximately the same dimensions thereof, is an axially movable ring 17 having contoured recesses 18 cut in the inner face thereof which are the same shape as the nozzle vanes 16. This is best shown in the exploded view constituting Fig. 2, wherein the relatively movable ring 17 is shown tilted through about 90° to more clearly illustrate the shape and location of the slots 18. These contoured slots 18 are adapted to mesh with and receive the nozzle vanes 16 in the manner best shown in Fig. 3 which shows one nozzle vane 16 received in the corresponding mating slot 18 of the relatively movable ring 17.

Accordingly, by moving ring 17 axially toward or away from fixed ring 15, the effective height H of the nozzle slot 20 formed between rings 15 and 17 and by the vanes 16 is varied. Inasmuch as the quantity of propulsion fluid delivered to nozzle slot 20 is controlled by the cross-sectional area of the nozzle passages between vanes 16 at their smallest point at the throat of the nozzles. The delivery of the propulsion fluid to the rotor 10 is regulated by adjusting the height H of the nozzle slot 20.

Figure 5:
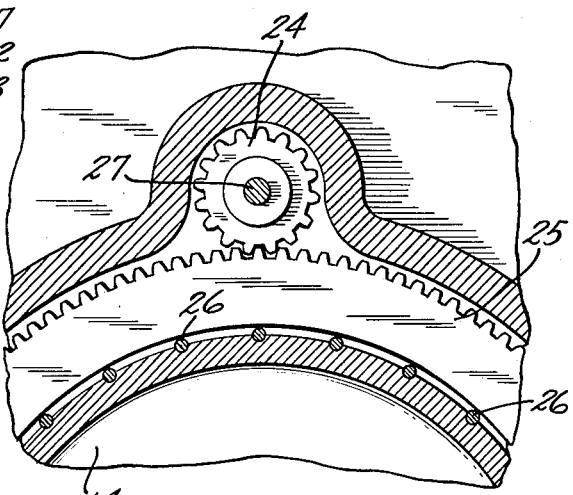
Fig. 5 is a fragmentary section through Fig. 4 as seen along the line 5—5 thereof, and illustrates the rack and pinion of the nozzle height adjusting mechanism of Fig. 4.

Although several mechanisms may be provided for moving ring 17 axially relatively to ring 15 to vary the height of H of the nozzle slot 20, a suitable form is shown in Figs. 4 and 5 and comprises rotatable pins 21 journalled and axially fixed in fixed ring 15 and having threaded ends 22 which screw into and out of corresponding threaded sockets 23 in the movable ring 17. The unthreaded ends of pins 24 extend beyond the fixed ring 15 and are provided with pinions 24 which mesh with the circular rack 25 which is mounted on roller or ball bearings 26 for rotary movement within a corresponding recess in the stator casing 14.

One of the pins 21 is extended as shaft 27 through an opening in the casing 14 and serves as the means for rotating circular rack 25. Shaft 27 is rotated either manually or by a suitable control mechanism 28 which may be regulated in accordance with load requirements of the turbine, such as the turbine of an aircraft cabin air conditioning system, an example of which is disclosed in copending application Serial No. 220,477, filed April 11, 1951 by V. L. Whitney, Jr., now Patent No. 2,691,274, dated November 12, 1954. When the turbine is used for that purpose, control 28 would be regulated in accordance with cabin temperature or pressure requirements, or both, although it may be regulated in other ways.

It will be observed that as shaft 27 is rotated to rotate circular rack 25, the pinions 24 cause the corresponding threaded pins 21 to be rotated, so that the latter move the ring 17 axially inwardly or outwardly toward or away from fixed ring 15 to thereby vary the height H of the nozzle slot 20. Hence, the propulsion fluid entering slot 20 from scroll 30 is controlled in accordance with the adjusted area of the turbine nozzles formed between vanes 16 and rings 15 and 17.

Figure 6:
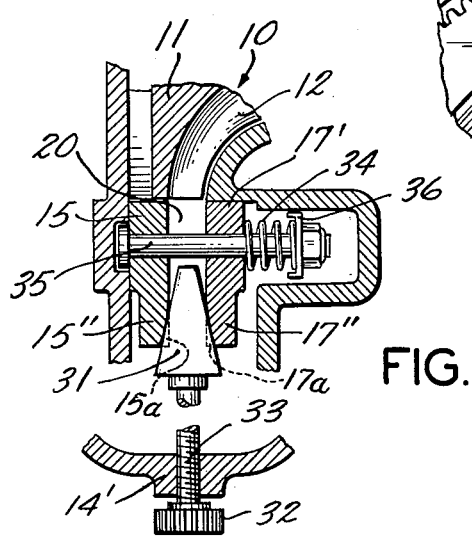
Fig. 6 illustrates an alternative way of adjusting the nozzle height.

Other means for adjusting the spacing of nozzle slot 20 may be employed, such as the alternative arrangement shown in Fig. 6 where rings 15' and 17' are provided with opposed flange-like lugs 15" and 17" which are milled to have tapering facing slots 15a and 17a slidably receiving a radially movable wedge 31 actuated by a pinion 32 rotating a pin 33 threaded through the wall of the casing 14' and loosely and rotatably connected with the wedge 31.

As pinion 32 is rotated by suitable control means, wedge 31 moves inwardly or outwardly as the case may be, to spread ring 17 from ring 15 or to allow ring 17 to move closer to ring 15 under the pressure of springs 34. Springs 34 are coil springs encircling axial guide pins 35 between the outer face of ring 17 and cap discs 36 on pins 35 so as to normally urge ring 17 toward ring 15. Guide pins 35 are secured to fixed ring 15 and extend slidably through ring 17, as is shown in Fig. 6.

The alternative mechanisms for varying the height H of the turbine nozzles by changing the width of nozzle slot 20 between rings 15 and 17 have been described as examples of suitable means for adjusting the movable ring 17 to vary the effective nozzle area in accordance with the present invention. By virtue of such adjustment, the propulsion fluid supply to the turbine rotor 10 may be quickly and accurately varied to accommodate the load requirements of the turbine without requiring complicated mechanism for effecting the desired results, even to the extent of disengaging the vanes 16 from their slots 18 if desired. Since the nozzle vanes 16 are not tilted, a substantial aerodynamic advantage is gained in some cases that the flow angle of the propulsion fluid leaving the nozzles to enter the turbine rotor 10 is constant over all values of weight flow.

In designing turbines embodying the present invention, the useful range of operation of the turbine may be somewhat increased by a decrease in the area of the exit duct 14' of the turbine. In some cases, it is practical to reduce the area of exit duct 14' to as much as one-third of the area normal in turbines not having an inlet area control, and thereby creating a pronounced peripheral component of the absolute leaving velocity for operation at unrestricted nozzle height H instead of designing for no or very little peripheral component of the absolute exit velocity as is common practice in single stage turbines. This arrangement will decrease the efficiency at unrestricted nozzle height slightly. This disadvantage is compensated for by increased efficiencies at restricted nozzle height so that the new arrangement increases the useful operating range of the turbine.

Although a centripetal turbine as an embodiment of the invention has been disclosed herein, it is to be understood that the invention is not limited thereto but is equally applicable to centrifugal turbines and furthermore that the invention is susceptible of changes in form and detail within the scope of the appended claims.

I claim:

1. In a fluid pressure turbine having a rotor and a stator with a propulsion fluid inlet leading to the rotor, the combination of rings mounted on the stator and spaced apart to form a nozzle slot interposed between said propulsion fluid inlet and the rotor, and means for adjusting the spacing between said rings to vary the height of the nozzle slot, said adjusting means including a radially movable wedge extending between and engaging said rings and means mounted on said stator for moving said wedge radially inwardly and outwardly.

2. In a fluid pressure turbine having a rotor with substantially radial blades and a stator with a propulsion fluid inlet leading to the peripheral edge of the rotor, the combination of a pair of rings mounted on the stator coaxially with said rotor and spaced apart to form a nozzle slot interposed between said propulsion fluid inlet and the peripheral edge of the rotor, fluid vanes extending axially from one of said rings across said nozzle slot into mating recesses in the other ring, a guide member fixed to one of said rings on said stator and extending slidably through the other ring to afford relative axial movement of said rings, and means mounted on said stator for relatively moving said rings axially in said stator to thereby vary the height of the nozzle slot, said means for relatively moving said rings including a radially movable wedge extending between and engaging said rings, and means carried by said stator for moving said wedge radially to move said rings relatively.

References Cited in the file of this patent

UNITED STATES PATENTS

| 678,817 | Tyler | July 16, 1901 |
| 1,085,045 | Holzapfel | Jan. 20, 1914 |
| 1,656,006 | Lieber | Jan. 10, 1928 |
| 2,285,976 | Huitson | June 9, 1942 |

FOREIGN PATENTS

| 305,214 | Great Britain | Jan. 29, 1929 |